United States Patent [19]

Menk

[11] Patent Number: 5,238,571
[45] Date of Patent: Aug. 24, 1993

[54] ARRANGEMENT FOR SEPARATING ENTRAINED PARTICLES FROM A STREAM OF MOLTEN METAL

[75] Inventor: Werner Menk, Schaffhausen, Switzerland

[73] Assignee: Georg Fischer AG, Schaffhausen, Switzerland

[21] Appl. No.: 725,443

[22] Filed: Jul. 3, 1991

[30] Foreign Application Priority Data

Jul. 5, 1990 [CH] Switzerland ............... 02243/90

[51] Int. Cl.$^5$ .................................. B01D 39/00
[52] U.S. Cl. ........................... 210/510.1; 210/500.1; 75/412; 266/222; 266/236
[58] Field of Search ................ 210/500.1, 510.1; 75/412; 266/227, 236

[56] References Cited

U.S. PATENT DOCUMENTS

| 4,258,099 | 5/1981 | Narumiya | 266/227 |
| 4,265,659 | 5/1981 | Blome | 210/510.1 |
| 4,395,333 | 7/1983 | Groteke | 266/227 |
| 4,866,011 | 9/1989 | Hargus et al. | 210/510.1 |

Primary Examiner—Robert A. Dawson
Assistant Examiner—David Reifsnyder
Attorney, Agent, or Firm—Bachman & LaPointe

[57] ABSTRACT

A method and a particle absorber for separating off entrained particles from a stream of molten metal are proposed. The particle absorber has a multiplicity of surfaces within the metal stream produced by means of mechanical separation. This separation leads to a change in the velocity of the flowing metal and to a change in the surface tension. The entrained non-metallic particles are pushed out of the metal stream into the surface regions and blocked there on the separation surfaces. The proposed method and the particle absorber show a good separation effect and, furthermore, are an inexpensive alternative to conventional systems.

4 Claims, 1 Drawing Sheet

ARRANGEMENT FOR SEPARATING ENTRAINED PARTICLES FROM A STREAM OF MOLTEN METAL

BACKGROUND OF THE INVENTION

The present invention relates to a ceramic filter arrangement having a plurality of effective surfaces for separating off entrained particles from a stream of molten metal.

Ceramic filters are known for purifying liquids. Ceramic filters have been successfully used in foundries, in order to keep impurities, such as slags, sand and refractory materials, away from the castings to be produced.

Ceramic filters having an open-cell foam structure are usually produced by impregnating an organic foam material, for instance polyurethane foam, with a low-viscosity ceramic slip or by impregnating the foam material with a high-viscosity slip and squeezing off the slip excesses by means of pairs of rollers.

WO 82/03339 discloses a ceramic filter of open-cell foam structure based on high-melting ceramic, which is produced by impregnating an organic foam material with a high-viscosity ceramic slip, drying, heating for removal of the foam material and calcining. Excess slip is removed after the impregnation of the foam material by passing the impregnated foam material through a system of pairs of rollers. Still further, exposed cell bridges located on the surface of the filter are secured against breaking off by additionally subjecting the dried impregnated foam material to a further impregnation with a ceramic slip on the surface. In this way, the temperature stability of the filter is enhanced. However, this further impregnation treatment is disadvantageous because not only the exposed cell bridges but also the filter regions located underneath are provided with the additional slip application. As a result, the permeability of the filter is impaired.

The fabrication of the ceramic filters described hereinabove, according to the state of the art, is very cost-intensive because of the diverse process sequences.

SUMMARY OF INVENTION

Accordingly, it is an object of the present invention to propose a ceramic filter arrangement for separating off particles from a stream of molten metal, where the filter arrangement is characterized by economical fabrication, coupled with a high filtration effect and an increased mechanical and thermal stability towards molten metals.

According to the present invention, the foregoing object is achieved by separating off entrained particles from a stream of molten metal by using a multiplicity of surfaces produced in the metal stream by means of mechanical separation. The particles are pushed out of the metal stream into a surface region as a result of changes in velocity and surface tension, and being blocked there on the mechanical separation surface.

Further advantageous embodiments of the invention are evident from the following description and drawings.

DETAILED DESCRIPTION

For producing the particle absorber according to the present invention, a carrier structure which remains in the absorber through the end of particle separation is made first. This carrier structure can consist of wire netting, steel wool or plastic. Wire nettings have been found to be particularly useful because, at present, they prove to be easy to handle and to process and thus they are preferred. Welded and braided wire nettings have been used to form the particle absorber or filter element. The uniform wettability with the slip shown by these nettings has proved to be of particular advantage, which has led to good homogeneity of the particle absorbers.

A particular advantage of the wire netting arrangement results from the fact that the strength of the particle absorber is determined by the carrier, i.e. by the wire netting, so that it is sufficient to dry the ceramic layer. As a result, no problems arise during use in the event of contact between the carrier and the melt.

In forming the desired particle absorber with at least one opening greater than the largest particle, $Al_2O_3$ and $ZrO_2$ may be used for the ceramic matrix. $AlPO_4$ and $Al(OH)_3$ may be added as a binder. A slip mixed from these constituents can be applied to the carrier material (wire netting) and dried. The exact proportion of slip ingredients depends upon the type and thickness of the coating to be applied to the carrier material. It has been found that drying may be substantially complete at 200° C.

Figure 1:
FIGS. 1 and 2 are photographs of the front and the side of the ceramic filter arrangement in accordance with the present invention.
Figure 2:
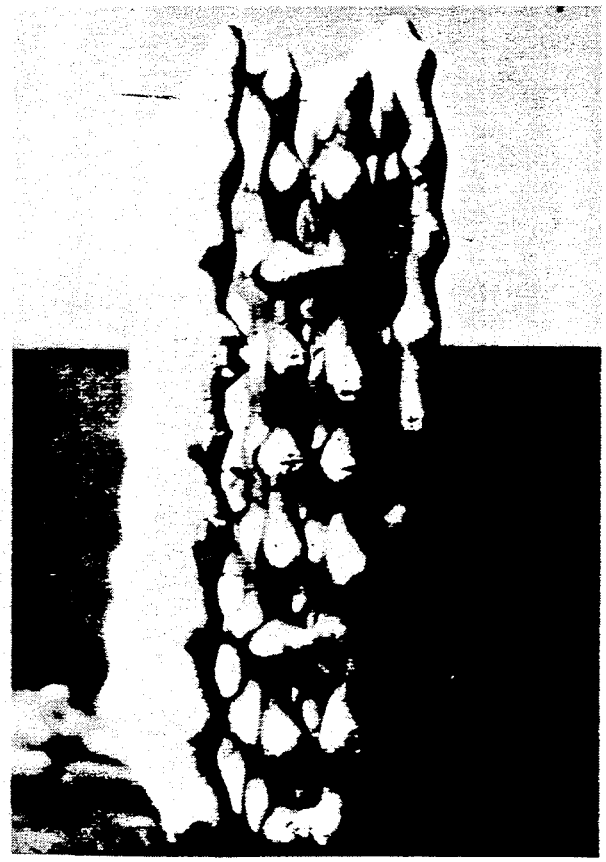

The filter arrangement of the present invention to create the desired filter effect is obtained by superpositioning a plurality of the particle absorbers described above to create a layer arrangement as shown in FIGS. 1 and 2. Each particle absorber (the ceramic coated wire netting) is arranged at a mutual distance from one another in a plurality of layers to form the filter arrangement having adjacent effective surfaces defining therebetween spaces.

The resulting filter arrangement is characterized by a plurality of effective surfaces which are free-standing, two dimensional structures, around which the molten stream can flow on all sides. The particle absorber has a number of contact surfaces. In operation, the effective surfaces of the particle absorber separate off the entrained particles as a result of increased surface tension along the contact regions or surfaces between the molten metal stream and the effective surfaces as well as changes in velocity of the molten metal stream.

To examine their effectiveness, particle absorbers formed as outlined above were inserted into conventional molds in a filer arrangement. 300 kg of perlitic cast iron with spheroidal graphite was contaminated with 50 g of FeS, heated to 1500° C., and cast into molds.

It can be stated that these tests confirmed the effectiveness of the particle absorbers. The results of the sulfur analysis, which are combined as follows in Table I, especially point to this fact.

TABLE I

|  | % S before the absorber | after the absorber |
|---|---|---|
| Trial 1 | 0.012 | 0.004 |
| Trial 2 | 0.013 | 0.006 |
| Trial 3 | 0.011 | 0.002 |

TABLE I-continued

|  | % S before the absorber | after the absorber |
| --- | --- | --- |
| Trial 4 | 0.011 | 0.003 |

The particle absorbers described herein demonstrated a good separation effect, which can be assessed from the impurities detected before and after the absorber. Thus, the non-metallic impurities were significantly lower after the absorber. Furthermore, the particle absorbers according to the invention provide an inexpensive alternative to conventional systems.

It is apparent that there has been provided in accordance with this invention an arrangement for separating entrained particles from a stream of molten metal which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A filter arrangement for separating entrained particles from a stream of molten metal comprises a plurality of particle absorbers having top and bottom effective surfaces, said particle absorbers being arranged in spaced apart relationship one above the other thereby defining spaces between the effective surfaces of adjacent particle absorbers such that the molten metal stream flows through the spaces and contacts the effective surfaces of the plurality of particle absorbers or separating off the entrained particles as a result of increased surface tension along contact regions between the molten metal stream and the effective surfaces, each of the particles absorbers comprises a carrier structure comprising a netting coated with ceramic.

2. A filter arrangement according to claim 1 wherein the carrier structure is a wire netting.

3. A filter arrangement according to claim 1 wherein the plurality of particle absorbers are each substantially flat planar members arranged in substantially parallel planes.

4. A filter arrangement according to claim 1 wherein the plurality of particle absorbers are joined to one another.

* * * * *

UNITED STATES PATENT AND TRADEMARK OFFICE
CERTIFICATE OF CORRECTION

PATENT NO. : 5,238,571
DATED : August 24, 1993
INVENTOR(S) : Werner Menk

It is certified that error appears in the above-indentified patent and that said Letters Patent is hereby corrected as shown below:

Column 4,
In claim 1, line 10 "or" should be changed to --for--.

Signed and Sealed this

Fifth Day of April, 1994

BRUCE LEHMAN

Attest:

Attesting Officer

Commissioner of Patents and Trademarks